H. B. HARDYK, Jr.
FEEDER FOR CORN SHELLERS.
APPLICATION FILED JULY 13, 1915.
1,198,438.
Patented Sept. 19, 1916.
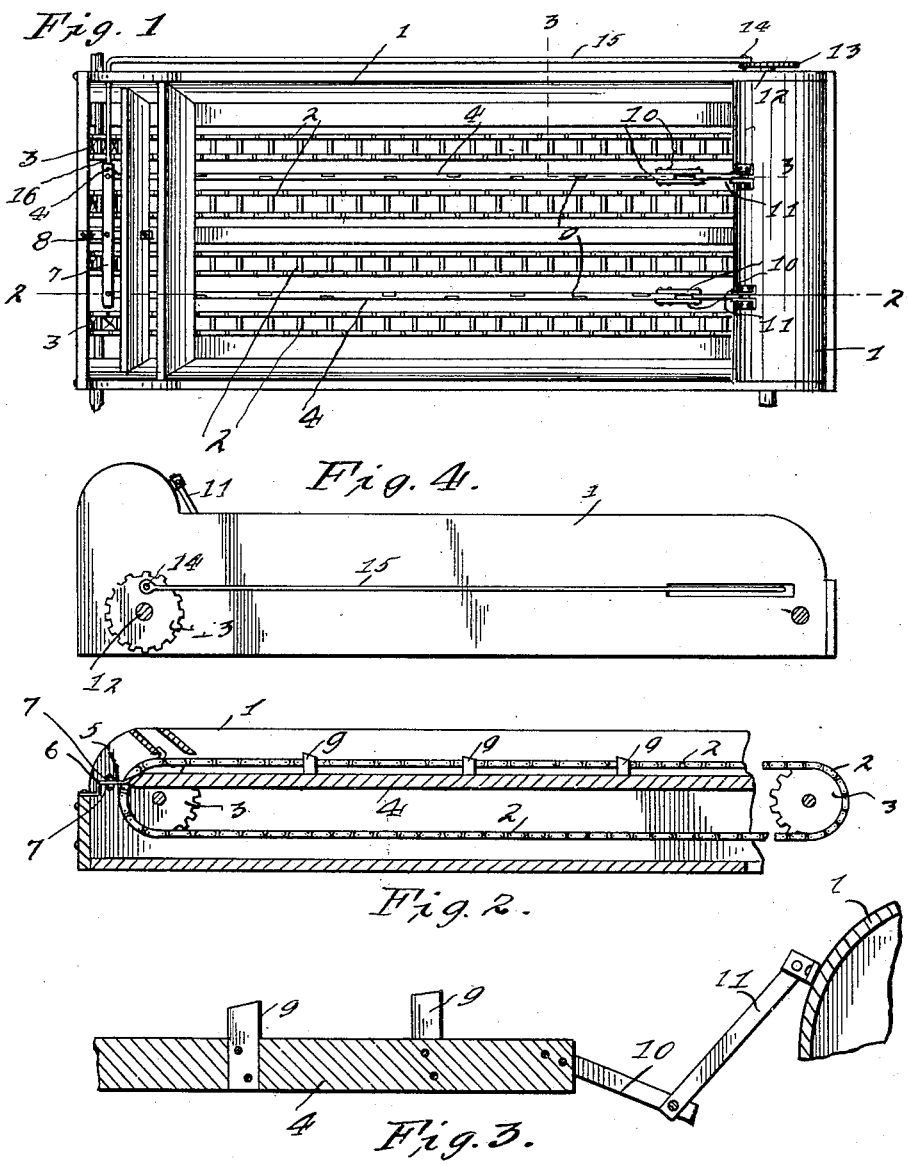

UNITED STATES PATENT OFFICE.

HENRY B. HARDYK, JR., OF ARMOUR, SOUTH DAKOTA.

FEEDER FOR CORN-SHELLERS.

1,198,438.  Specification of Letters Patent.  Patented Sept. 19, 1916.

Application filed July 13, 1915. Serial No. 39,715.

*To all whom it may concern:*

Be it known that I, HENRY B. HARDYK, Jr., a citizen of the United States, residing at Armour, in the county of Douglas, State of South Dakota, have invented certain new and useful Improvements in Feeders for Corn-Shellers; and I do hereby declare the following to be a full, clear, and exact description of the invention, such as will enable others skilled in the art to which it appertains to make and use the same.

The present invention is directed to improvements in feeding devices for corn shellers, and has for its object to provide a device of this character with a novel form of agitator.

A further object of the invention is to provide the feed hopper of a corn sheller with an agitator designed to keep the ears of corn in motion so that they will be fed straight to the shelling mechanism.

With these and other objects in view, this invention resides in the novel features of construction, formation, combination and arrangement of parts to be hereinafter more fully described, claimed and illustrated in the accompanying drawing, in which:—

Figure 1 is a top plan view of the feed hopper, showing the agitators associated therewith. Fig. 2 is a sectional view on line 2—2 of Fig. 1. Fig. 3 is a sectional view on line 3—3 of Fig. 1. Fig. 4 is a side elevation of the hopper, equipped with the device.

Referring to the drawing the numeral 1 designates the feed hopper, which has arranged longitudinally therein the feed chains 2, which are trained around sprocket wheels 3, all of which are of the usual construction.

The agitator comprises bars 4, which are placed between the feed chains 2, said bars being formed from sheet metal, and each is partially twisted adjacent one of its ends, as at 5 so as to provide a horizontal plate 6, which are adapted to be pivotally connected between the bars 7. A bracket 8 is provided, and is also pivotally connected between the bars 7, said bracket being adapted to be suitably connected to the lower end of the feed hopper 1. The agitator bars 4 have attached thereto vertical fingers 9, which are disposed on opposite sides of the bars, and decrease in length. One end of each of the bars 4 is provided with spaced strips 10, which are adapted to be pivotally connected to links 11, which are attached to the upper end of the feed hopper 1, said links being also adapted for pivotal movement.

Fixed to the outer end of the shaft 12 of the feeding mechanism is a disk 13, said disk having a pin 14 eccentrically located thereon, and to which is pivotally connected one end of the link 15, said link having its other end provided with a plate 16, which is pivotally connected between the adjacent ends of the bars 7.

From this construction it will be seen that when the link 15 is reciprocated that the bars 7 will oscillate, thereby imparting reciprocatory movement to the agitator bars 4. It is obvious that upon reciprocation of the bars 7 that the ears of corn will be agitated so as to feed straight to the shelling mechanism, and will also serve to prevent clogging of the feed chains.

What is claimed is:—

In combination with a feed hopper of the class described, a bracket fixed to the lower end thereof, links pivotally connected to the upper end thereof, bars pivotally connected to the bracket, agitator bars having their lower ends pivotally connected between the ends of said bars, the lower ends of said agitator bars being pivotally connected to the links, a link having its lower end pivotally connected between said bars, means for reciprocating said link to oscillate the bars, thereby imparting reciprocatory movement to the agitator bars, and fingers disposed alternately on opposite sides of the agitator bars and extending upwardly therefrom.

In testimony whereof I affix my signature in the presence of two witnesses.

HENRY B. HARDYK, JR.

Witnesses:
H. T. HEISLER,
C. M. HINCKLEY.

Copies of this patent may be obtained for five cents each, by addressing the "Commissioner of Patents, Washington, D. C."